United States Patent [19]

Neubert

[11] 3,887,532

[45] June 3, 1975

[54] METHOD OF COAGULATING LATICES

[75] Inventor: Terry C. Neubert, Kent, Ohio

[73] Assignee: The Goodyear Tire & Rubber Company, Akron, Ohio

[22] Filed: Feb. 15, 1973

[21] Appl. No.: 332,850

[52] U.S. Cl. ...... 260/85.1; 260/93.5 A; 260/93.5 W; 260/94.7 R; 260/94.7 HA; 260/94.7 N; 260/94.7 S; 260/33.6 AQ; 260/821
[51] Int. Cl. .......................... C08d 5/02; C08d 5/04
[58] Field of Search .............. 260/821, 85.1, 94.7 R, 260/93.5 A, 93.5 W, 33.6 AQ, 94.7 HA, 94.7 S, 94.7 N

[56] References Cited
UNITED STATES PATENTS

| | | | |
|---|---|---|---|
| 2,095,107 | 10/1937 | Szegvari | 260/821 |
| 2,497,464 | 2/1950 | Meeker et al. | 260/821 |
| 2,912,407 | 11/1959 | Reynolds | 260/33.6 AQ |
| 3,131,160 | 4/1964 | Alexander | 260/33.6 AQ |
| 3,520,860 | 7/1970 | Bon | 260/85.1 |

OTHER PUBLICATIONS

The O. G. Defensive Publication, Jones, Def. Pub. of S.N. 31860, filed 5-1-70, published in 883 O.G. 11 on 2-2-71, Defensive Publication No. T883012.

*Primary Examiner*—William F. Hamrock
*Attorney, Agent, or Firm*—F. W. Brunner; J. Y. Clowney; R. A. Thompson

[57] ABSTRACT

A method of coagulating synthetic latices, the improvement being a combination of using a temperature between about 45°C. and 95°C., selecting an acid from the group of sulfuric, hydrochloric, acetic, nitric and phosphoric, and selecting a salt from the group consisting of ferric chloride, ferric nitrate, ferric sulfate, aluminum chloride, aluminum nitrate and aluminum sulfate.

9 Claims, No Drawings

METHOD OF COAGULATING LATICES

The present invention relates to improvements in the processing of latices and provides an improved method for effecting the coagulation of polymers from colloidal emulsion thereof, generally known as latex.

This invention is of particular utility as applied to the coagulation of synthetic latices as it greatly reduces the amount of effluent pollution while maintaining or improving the rubber quality.

Synthetic latex is generally made by using certain materials called emulsifiers which emulsify the monomer, provide polymerization sites and stabilize the resulting latex. Latex is a colloidal emulsion of rubber particles dispersed in an aqueous medium.

Such emulsifiers useful for this invention as well as being known in the prior art are prepared by reacting alkali metals with fatty acids, alkali metals with disproportionated rosin acids, and some commercial synthetic emulsifiers.

By means of initiators, sometimes called catalysts, the emulsified monomers are caused to polymerize to form a high polymer in a dispersion called latex. When the desired conversion of monomer to polymer is achieved, the polymerization is terminated by a short stop agent. The latex, for instance, rubbery styrene/butadiene (SBR) either hot or low temperature prepared, may be premixed with a compounding oil to form so-called oil extended latex.

In the compounding of rubber for the manufacture of tires, it is conventional practice to disperse carbon black and other compounding ingredients in the dry rubber by dry mixing in a Banbury mixer or on a rubber mill, or the like. Before such mixing can be effected, the rubber must be coagulated and separated from the latex serum and dried.

The coagulation is usually effected by mechanically agitating the latex with a salt-acid medium. Heretofore, the salt-acid coagulation method of separating the rubber from the serum has resulted in a large amount of dissolved solid material (salt) in the serum and when this serum is discarded has caused an effluent pollution problem.

Prior art methods have utilized mineral acids as their acidic medium, particularly $H_2SO_4$, inorganic salts such as sodium chloride for their salt.

The present invention provides an improved method of coagulating rubber latices whereby the undesirable dissolved solid material (salt) in the serum is greatly reduced, thus aiding the pollution problem. The desirable rubber qualities are maintained, while utilizing a less expensive coagulation system.

According to the invention, a synthetic latex, selected from the group consisting of copolymers of butadiene/styrene and homopolymers of butadiene or styrene which are prepared using an emulsifier, is coagulated at temperatures between about 45°C. and about 95°C. and the coagulation solution consists of an acid selected from the group of sulfuric, hydrochloric, acetic, nitric and phosphoric, and a salt which is selected from the group of ferric chloride ($FeCl_3$), ferric nitrate ($Fe(NO_3)_3$), ferric sulfate ($Fe_2SO_4)_3$), aluminum chloride ($AlCl_3$), aluminum nitrate ($Al(NO_3)_3$), and aluminum sulfate ($Al_2(SO_4)_3$), and the salt level is adjusted from about 0.16 to about 0.56 equivalents of the salt metal ion per equivalent of emulsifier and sufficient acid to maintain a final pH of less than 6.

By utilizing the teachings shown in the invention, one hundred pounds of rubber from a latex such as that in Example I can be coagulated and separated from the serum by using as little as 1.05 pounds of total coagulating material. Prior art methods can require as much as nine pounds of coagulant to coagulate 100 pounds of polymer from the same latex as that in Example I and these water soluble solid coagulants must be washed from the polymer and discarded, thus causing a disposal problem. By utilizing the invention, rubber comes out as small rubber crumbs, low in tack, which do not foul the equipment and a clear serum results which is very low in solids content.

The method by which the above-mentioned polymers are formed can be any of the well-known methods utilizing fatty acid and fatty/rosin acid emulsifiers. The various methods, catalysts, soaps and the like used to make conventional butadiene or styrene polymers and butadiene/styrene copolymers are known in the art and therefore will not be discussed in detail.

Similarly well known are the conventional methods for coagulating fatty acid and fatty/rosin acid emulsified polymers and copolymers from the latex. For example, such polymers can be coagulated by treating the latex with acids, salts and the like.

By this invention, coagulating techniques already known in the prior art are employed using a particular combination that requires an unexpectedly low level of coagulant when used in conjunction with high coagulation temperature. This much lower level of coagulating agent results in a much lower level of serum pollution, but the rubber is essentially the same as that normally obtained by the prior art.

The temperature of the coagulating solution during the coagulation process is at least 45°C., preferably in the range of from 60°C. to about 95°C. although temperatures higher than 95°C. can be employed if desired. The coagulating solution is heated to at least 45°C. before the latex has been brought into contact with the coagulating solution, and sufficient heat is introduced to maintain the desired elevated temperature in the coagulation mixture during the operation to obtain a clear serum. It has been found that the higher the temperature employed, the faster the coagulating and separating of the polymer from the serum takes place.

It should be understood that even though certain lower limits of coagulating agents are mentioned in the specification, one not interested in obtaining the lowest effluent pollution control might operate while using a higher amount of coagulants but such utilization of higher amounts would be within the scope and spirit of this invention.

It should also be understood that the water soluble trivalent metal ions of the salt are one of the important aspects of this invention, and that any other water soluble trivalent metal ions, although not specifically claimed, will be within the teachings of this invention and equivalent thereto.

There are some prior art methods in which Alum ($Al_2(SO_4)_3$) is utilized as the sole coagulant. However, this type of coagulating system results in a dry rubber material with a higher Mooney viscosity and therefore means that processing and rubber formulations may have to be altered.

With the process used in the present invention, the pollutants are greatly reduced, and the dry rubber material retains properties equal to and in some cases better than the dry rubber produced by the prior art salt/acid methods and therefore would require no new compounding formulations.

The practice of this invention is further illustrated by reference to the following examples which are intended to be representative rather than restrictive of the scope of this invention.

EXAMPLE I

SBR 1712 latex is prepared at 5°C. using the following recipe:

| Ingredient | Parts by Weight |
|---|---|
| Butadiene | 71.0 |
| Styrene | 29.0 |
| Water | 200.0 |
| Sodium salt of tallow fatty acid | 2.25 |
| Potassium salt of dispropor-tionated rosin acid | 2.25 |
| Sodium salt of condensed naphthalene sulfonic acid | 0.133 |
| $K_3PO_4$ | 0.404 |
| T-dodecyl mercaptan | 0.1 |
| Para-menthane hydroperoxide | 0.06 |
| Chelated iron-sodium formaldehyde sulfoxolate activator | 0.151 |
| Short stop at 60% conversion | 0.10 |

The latex is steam stripped under vacuum to remove unreacted monomer. Two equal parts of this latex are oil extended with 37.5 parts of highly aromatic oil/100 parts of rubber. The oil is added as a 50 percent oil emulsion containing a phenolic antioxidant. One oil extended latex portion is coagulated using the conventional salt-acid process and the other oil extended latex portion coagulated using the acid-alum process of this invention at about 60°C. In the coagulations, the coagulating chemicals are dissolved in the coagulating water at 50° to 70°C. and then the latex is added to this solution over a five to 10 period with agitation. The product in each case is a medium size crumb with the acid-alum coagulated crumb having about the same tack as the salt-acid crumb. In each case the total volume of serum is equal. Conditions and test results are as follows:

| | Type Coagulation (Brine) Salt-Acid | Acid-Alum |
|---|---|---|
| $Al_2(SO_4)_3$ lbs/100 lbs rubber | — | 0.31 |
| $H_2SO_4$ lbs/100 lbs rubber | 1.7 | 1.25 |
| NaCl lbs/100 lbs rubber | 7.0 | — |
| Polyamine coagulation aid lbs/100 lbs rubber | 0.02 | — |
| Serum Properties | | |
| COD[1] Mg/Liter | 1000 | 300 |
| Appearance | Slightly turbid | Clear |
| pH | 5.3 | 5.0 |
| Solids content % | 1.5 | 0.35 |

[1] Chemical Oxygen Demand, the amount of oxygen necessary to oxidize the organic material in the water to a certain predetermined level. ASTM Test Method D 1252.

EXAMPLE II

This example illustrates that the acid/alum system compared favorably with the prior art (salt/acid) coagulation method in that the chemical and physical properties of the rubber are similar.

SBR 1778 latex is prepared at 5°C. using the following recipe:

| Ingredient | Parts by Weight |
|---|---|
| Butadiene | 71.0 |
| Styrene | 29.0 |
| Water | 200.0 |
| Sodium salt of tallow fatty acid | 2.25 |
| Potassium salt of dispropor-tionated rosin acid | 2.25 |
| Sodium salt of condensed naphthalene sulfonic acid | 0.133 |
| $K_3PO_4$ | 0.404 |
| T-dodecyl mercaptan | 0.1 |
| Para-menthane hydroperoxide | 0.06 |
| Chelated iron-sodium formaldehyde sulfoxolate activator | 0.151 |
| Short stop at 60% conversion | 0.10 |

The latex is steam stripped under vacuum to remove unreacted monomer. Two equal parts of this latex are oil extending with 37.5 parts of naphthenic oil/100 parts of rubber. The oil is added as a 50 percent oil emulsion containing a phenolic antioxidant. One oil extended latex portion is coagulated using the conventional salt-acid process and the other oil extended latex portion coagulated using the acid-alum process of this invention at about 60°C. Chemical and physical test data are as follows:

| Property | Acid/Alum Coagulation | Acid/Brine | SBR 1778 Specification |
|---|---|---|---|
| Volatile matter,% | 0.10 | 0.23 | 0.75 Max. |
| Ash, % | 0.36 | 1.00 | 1.50 Max. |
| Organic acid, % | 5.12 | 5.20 | 5.2 ± .8 |
| Oil, % | 27.1 | 26.9 | 27.3 ± 2.5 |
| Raw viscosity, ML/4 | 51 | 47 | 48 ± 6 |
| Compound viscosity, ML/4 | 74 | 66 | 55–84 |
| Tensile, psi * | 3000 | 2960 | 2600 Min. |
| Elongation, % | 570 | 530 | 450 Min. |
| 300% Modulus, 25'/145°C. | 880 | 935 | 750–1150 |
| 300% Modulus, 35'/145°C. | 1230 | 1360 | 1150–1550 |
| 300% Modulus, 50'/145°C. | 1440 | 1600 | 1400–1800 |
| Processability | 1.15 | 1.18 | 2.5 Max. |
| Tuber Weight | 87 | 98 | 88 ± 14 |

* ASTM D15 Cure and Test Method

While certain representative embodiments and details have been shown for the purpose of illustrating the invention, it will be apparent to those skilled in this art that various changes and modifications may be made therein without departing from the spirit or scope of the invention.

What is claimed is:

1. In a process for coagulating synthetic latices selected from the group consisting of homopolymers of butadiene and styrene, and copolymers of butadiene/styrene which have been prepared using as emulsifiers, alkali metal salts of fatty acids and/or alkali metal salts of disproportionated rosin acids and selecting a coagulating salt from the group consisting of ferric chloride, ferric nitrate, ferric sulphate, aluminum chloride, aluminum nitrate, and aluminum sulphate, the improvement comprising heating a coagulation solution at a temperature between about 45°C. and about 95°C. before introducing said latices to the coagulation solution and adjusting equivalents of metal ion of said coagulating salt between 0.16 and about 0.56 per equivalent of said emulsifier and adding enough acid to maintain a final pH of less than 6.

2. The process of claim 1 in which the latex is mixed with an oil extender prior to coagulating.

3. The process of claim 1 in which the coagulation solution is heated to a temperature between about 60°C. and about 85°C.

4. The process of claim 1 in which the coagulating salt is aluminum sulfate.

5. The process of claim 1 in which the coagulating acid is sulfuric.

6. The process of claim 1 in which the latex is polybutadiene.

7. The process of claim 1 in which the latex is polystyrene.

8. The process of claim 1 in which the latex is a butadiene/styrene copolymer.

9. The process of claim 1 in which aluminum sulfate and sulfuric acid are used to coagulate a butadiene/styrene oil extended latex at from about 60°C. to about 85°C.

* * * * *